(12) United States Patent
Mathias, Jr. et al.

(10) Patent No.: US 7,591,417 B1
(45) Date of Patent: Sep. 22, 2009

(54) TRACKING INVENTORY OF CARDS HAVING EXPIRATION DATES

(75) Inventors: Virgil M. Mathias, Jr., Parker, CO (US); David R. Baumgartner, Parker, CO (US)

(73) Assignee: Visa U.S.A., Inc., Foster City, CA (US)

( * ) Notice: Subject to any disclaimer, the term of this patent is extended or adjusted under 35 U.S.C. 154(b) by 599 days.

(21) Appl. No.: 11/322,456

(22) Filed: Dec. 30, 2005

(51) Int. Cl.
*G06K 5/00* (2006.01)

(52) U.S. Cl. .................... 235/380; 235/385; 705/22; 705/28

(58) Field of Classification Search ............ 235/380, 235/385, 487; 705/22, 28
See application file for complete search history.

(56) References Cited

U.S. PATENT DOCUMENTS 7,050,991 B2 * 5/2006 Ogasawara ............ 705/22
7,086,947 B2 * 8/2006 Walker et al. ............ 463/25
7,281,653 B2 * 10/2007 Beck et al. ............. 235/380

* cited by examiner

*Primary Examiner*—Edwyn Labaze
(74) *Attorney, Agent, or Firm*—Hickman Palermo Truong & Becker LLP

(57) ABSTRACT

The inventory of expiration date sensitive cards is tracked such that re-ordering can be automatically initiated. A first value is generated based on how many cards are in stock at a particular site. The site may be a card issuer site, although the site may also be a vendor site or other site. An expiration date is determined for each of the cards in stock at the particular site. Based on the current date and the expiration dates associated with the cards, a number of expired cards in the stock at the particular site is determined. An inventory total is generated based, at least in part, on the first value and the number of expired cards. The inventory total is compared with a threshold value to determine whether a re-order criterion for cards at the particular site has been satisfied.

46 Claims, 12 Drawing Sheets

Card Inventory — Stock Summary
Home > Stock Summary

- ☑ Overview  _250_
- Stock Summary
- Order Queue
- ☑ Tasks
- New Order
- Stale Cards
- Stale Cards by Expiration Date
- Transfer Cards
- Damaged Cards
- ☑ Reports
- Location Card Status Detail Report
- Order Summary & Detail Report
- ☑ Settings  _252_
- Default Settings
- Location Settings

Select Location  _205_

Issuer: *  [YourBank]  _210_
Card Program: *  [YourBank Gift Card]  _102_
Location: *  [- Select -]

_200_

| Card Design _230_ | Embossed Message _235_ | Pre-Defined Value _240_ | Quantity on Hand _215_ | Quantity on Order _220_ | Pending Order _225_ |
|---|---|---|---|---|---|
| Generic - Blue | A Gift For You | Flexible | 0 | 0 | No |
| Generic - Green | A Gift For You | 25.00 | 0 | 0 | No |
| Generic - Blue | Happy Holidays | Flexible | <u>1245</u> | 2000 | Yes |
| Generic - Blue | A Gift For You | Flexible | <u>3233</u> | 0 | No |
| Generic - Blue | A Gift For You | 25.00 | 0 | 0 | No |
| Generic - Blue | Merry Christmas | 50.00 | 0 | 0 | No |

[CANCEL]  [SUBMIT] [RESET]

FIG. 2

Card Inventory — Default Settings
Home > Default Settings >

- ☑ Overview
- Stock Summary
- Order Queue
- ☑ Tasks
- New Order
- Stale Cards
- Stale Cards by Expiration Date
- Transfer Cards
- Damaged Cards
- ☑ Reports
- Location Card Status Detail Report
- Order Summary & Detail Report
- ☑ Settings
- Default Settings
- Location Settings

Select Issuer and Card Program

Issuer: *  YourBank
Card Program: *  YourBank Gift Card

Available Card Stock

| Available to Locations | Card Stock | Embossed Message |
|---|---|---|
| ☑ | Generic - Blue | Happy Holiday |
| ☑ | Generic - Blue | Congratulations |
| ☐ | Generic - Blue | Happy Birthday |
| ☐ | Generic - Blue | Happy Valentines |
| ☐ | Generic - Blue | Thank You |
| ☐ | Generic - Blue | Happy 4th of July |

Card Program Default Settings 310

Auto-Reorder: 320  330  ○ Available  ● Unavailable
Approval Notification Follow-up Days: [4]
Receipt Notification Follow-up Days: 335 [4]
Sale Stock Months: 325 [3]

Contact Information

| Name | Title | Email | Phone |
|---|---|---|---|
| | | | |

FIG. 3A

☐ Card Inventory — Default Settings Detail
Home > Default Settings

☑ Overview
Stock Summary
Order Queue
☑ Tasks
New Order
Stale Cards
Stale Cards by Expiration Date
Transfer Cards
Damaged Cards
☑ Reports
Location Card Status Detail Report
Order Summary & Detail Report
☑ Settings
Default Settings
Location Settings Stock: Generic - Blue
Message: Happy Holidays
Card Value: Flexible Default Settings — 360
Auto-Reorder
Minimum Order Quantity: — 390

● On (Orders do NOT require issuer approval)
○ Off (Orders require issuer approval)
[ 50 ]

Inventory Levels By Month
— 370

| | Jan | Feb | Mar | Apr | May | Jun | Jul | Aug | Sep | Oct | Nov | Dec |
|---|---|---|---|---|---|---|---|---|---|---|---|---|
| Reorder Point: | 100 | 100 | 100 | 100 | 100 | 100 | 100 | 100 | 100 | 100 | 200 | 200 |
| Order Quantity: | 200 | 200 | 200 | 200 | 200 | 200 | 200 | 200 | 200 | 200 | 400 | 400 |

— 380

[CANCEL] [RESET] [SUBMIT]

FIG. 3B

Card Inventory — Order Queue
Home > Order Queue

☑ Overview
Stock Summary
Order Queue
☑ Tasks
New Order
Stale Cards
Stale Cards by Expiration Date
Transfer Cards
Damaged Cards
☑ Reports
Location Card Status Detail Report
Order Summary & Detail Report
☑ Settings
Default Settings
Location Settings

Show Orders Matching These Criteria

| Issuer:* | YourBank | From Date: [MM-DD-YYYY] | |
|---|---|---|---|
| Card Program:* | YourBank Gift Card | Order Status: | Pending Approval |
| Location:* | - Select - | To Date: [MM-DD-YYYY] | |
| | | Order Number: | |

[CANCEL] [RESET]

Location(es): 101 -0141 E. 6th Ave,, 102 - Downtown Location, 103 - Golden Location
Matching Orders: 7

| Location | Date Order Created | Order Number 700 | Card Design | Status 710 | Status Date |
|---|---|---|---|---|---|
| 100 - 141 E. 6th Ave. | 08-01-2004 | 12345678901023450 | Generic - Blue | Pending Approval | 08-30-2004 |
| 100 - 141 E. 6th Ave. | 08-01-2004 | 12345678901023457 | Generic - Blue | Approved | 08-30-2004 |
| 100 - 141 E. 6th Ave. | 08-01-2004 | 12345678901023451 | Generic - Blue | Pending Submittal | 08-30-2004 |
| 100 - 141 E. 6th Ave. | 08-01-2004 | 12345678901023452 | Generic - Blue | Rejected | 08-30-2004 |
| 103 - Golden | 08-01-2004 | 12345678901023454 | Generic - Blue | In Process | 08-30-2004 |
| 103 - Golden | 08-01-2004 | 12345678901023455 | Generic - Blue | Received | 08-30-2004 |
| 103 - Golden | 08-01-2004 | 12345678901023455 | Generic - Blue | Not Received | 08-30-2004 |

Card Inventory — Stale Cards by Expiration Date
Home > Stale Cards by Expiration Date

- ☑ Overview
- Stock Summary
- Order Queue
- ☑ Tasks
- New Order
- Stale Cards
- Stale Cards by Expiration Date
- Transfer Cards
- Damaged Cards
- ☑ Reports
- Location Card Status Detail Report
- Order Summary & Detail Report
- ☑ Settings
- Default Settings
- Location Settings

Find Cards Matching These Criteria (Your card program recommends staling cards that will expire <6> months from now) — 905

Issuer:* 902 [YourBank]
Card Program:* 906 [YourBank Gift Card]    From Expiration Date [MM/YY]:* [ ]/[ ]
Location:* [All]    To Expiration Date [MM/YY]:* 908 [ ]/[ ]

[CANCEL] [RESET] [SEARCH]

Card Details — 917    900

| Check All | Card Number | Exp Date | Status | Status Date | Card Design | Embossed Message | Card Value |
|---|---|---|---|---|---|---|---|
| ☑ | 4999 1234 5678 5671 | 08/07 | Pending Issuance | 08-01-2004 | Happy Holidays | Happy Holidays! | Flexible |
| ☑ | 4999 1234 5678 5672 | 08/07 | Pending Issuance | 08-01-2004 | Happy Holidays | Happy Holidays! | Flexible |
| ☐ | 4999 1234 5678 5673 | 08/07 | Pending Issuance | 08-01-2004 | Happy Holidays | Happy Holidays! | Flexible |
| ☐ | 4999 1234 5678 5674 | 08/07 | Pending Issuance | 08-01-2004 | Happy Holidays | Happy Holidays! | Flexible |
| ☐ | 4999 1234 5678 5675 | 08/07 | Pending Issuance | 08-01-2004 | Happy Holidays | Happy Holidays! | Flexible |
| ☐ | 4999 1234 5678 5676 | 08/07 | Pending Issuance | 08-01-2004 | Happy Holidays | Happy Holidays! | Flexible |
| ☐ | 4999 1234 5678 5677 | 08/07 | Pending Issuance | 08-01-2004 | Happy Holidays | Happy Holidays! | Flexible |
| ☐ | 4999 1234 5678 5900 | 08/07 | Pending Issuance | 08-01-2004 | Happy Holidays | Happy Holidays! | Flexible |

Check All

920 — [STALE]

FIG. 9

TRACKING INVENTORY OF CARDS HAVING EXPIRATION DATES

FIELD OF THE INVENTION

The present invention relates to inventory control, and in particular, to tracking inventory of cards that have expiration dates.

BACKGROUND OF THE INVENTION

To meet consumer demand for convenient ways in which to make purchases, a variety of types of cards are marketed that allow consumers to make purchases without paying cash. Often, such cards have an expiration date. One example is a debit card that is issued with a certain value to a consumer, thus allowing the consumer to make purchases up to the value of the card. There are a variety of categories of debit cards, including gift cards, travel cards, and payroll cards.

A pre-paid gift card is a prepaid card that can be used everywhere debit cards are accepted, including retail stores and online merchants. Because it is a prepaid card, spending is limited to the amount of money placed on the card by the purchaser. Such cards are often used for birthdays, holidays, weddings, and all other gift-giving occasions. These cards have advantages over cash such as being replaceable if lost or stolen.

A travel card is a prepaid card that offers business and pleasure travelers a better alternative to traveler's cheques and cash. A travel card can be used to make purchases while avoiding the cost of converting currency at exchange bureaus and the risk of carrying cash while traveling.

A payroll card allows an employer an innovative way of paying employees. A payroll card is a reloadable prepaid card. Each pay period, the employee's earned finds are automatically loaded onto the card and available on payday—similar to direct deposit.

The task of tracking inventory of cards is a very difficult one. For example, the card issuer may have hundreds or thousands of different locations at which cards are issued. These cards can be issued instantly to customers at a given location, such as a bank or retail store. Furthermore, the cards may be embossed with many different designs, depending on their intended use. Moreover, replacement cards may be stored at a vendor site that is not under control of the card issuer. A still further complication is that each card may have an expiration date associated therewith. Thus, a need exists to accurately and conveniently track the inventory of cards having an expiration date.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is an exemplary graphical user interface that depicts a card inventory summary, in accordance with an embodiment of the present invention;

FIG. 3A is an exemplary graphical user interface (GUI) that allows a user to set configuration parameters, in accordance with an embodiment of the present invention;

FIG. 3B illustrates a GUI that allows a user to configure default settings, in accordance with an embodiment of the present invention;

FIG. 7 illustrates an exemplary GUI including an order queue for a given card issuer, in accordance with an embodiment of the present invention;

FIG. 9 illustrates a GUI that allows a user associated with a card issuer to search for cards having a given range of expiration dates, in accordance with an embodiment of the present invention.

DETAILED DESCRIPTION OF THE INVENTION

A method, apparatus, and system for tracking inventory of cards having an expiration date is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Figure 1:
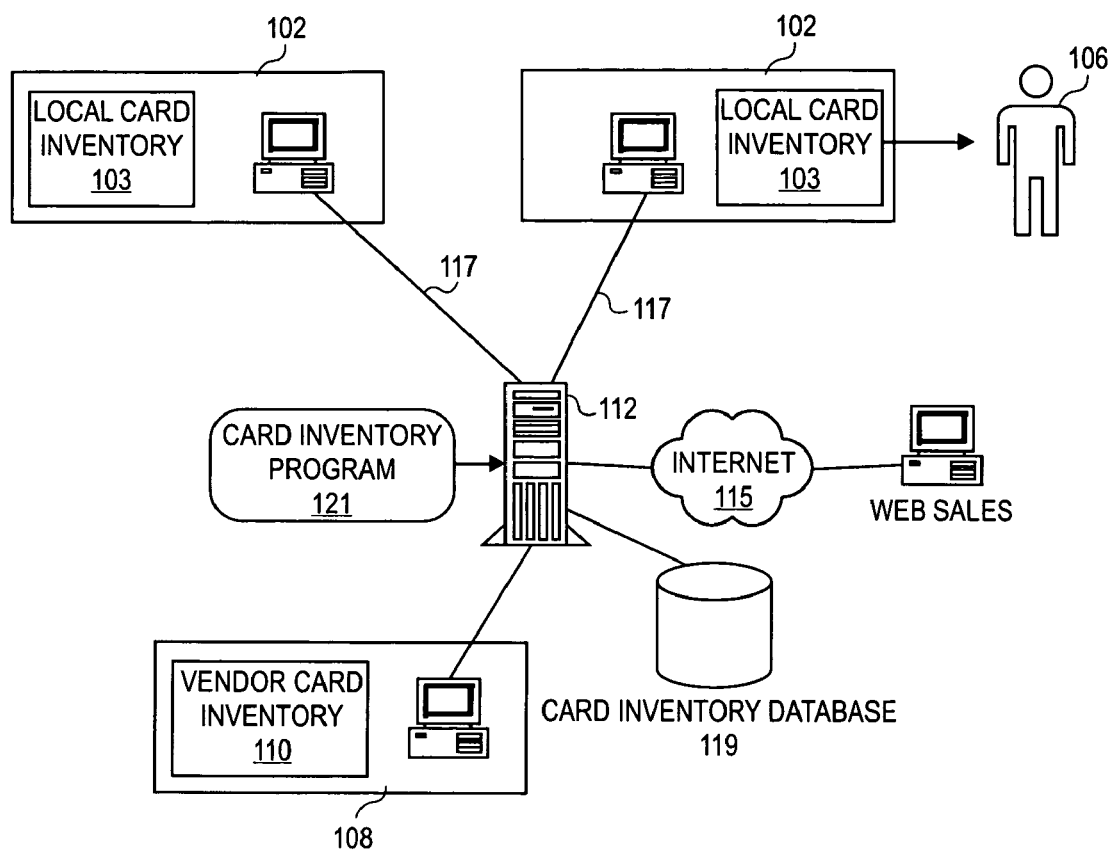
FIG. 1 is a diagram illustrating an inventory system for tracking cards having expiration dates, in accordance with an embodiment of the present invention.

FIG. 1 illustrates a system 100 in which inventory of cards having an expiration date ("expiration sensitive cards") is tracked, in accordance with an embodiment of the present invention. The expiration sensitive cards may be pre-paid debit cards, although the present invention is not so limited. A card issuer has a number of cards physically stored in local card inventory 103 at a particular site 102. As an example, a particular site may be a bank, store, or other entity at which a customer 106 may wish to purchase a debit card.

When issued to the customer 106, each card may have a given monetary value associated with it such that the card may be used to make retail purchases or the like. The cards might be purchased by the customer to give as a gift, to use when traveling, or to give to a teenager. Therefore, the cards may have various designs that are appropriate for their intended use. The card issuer may create a card design and contact the card vendor 108 to produce and deliver the physical cards.

Typically, the card issuer will place a large order with the card vendor 108 for blank cards that do not have any consumer purchasing value associated therewith. These cards are held in the vendor's inventory 110 where they are ready to be shipped to a particular card issuer site 102 by, for example, overnight shipping. However, because the cards do not have any purchasing power at this time, the card issuer does not have substantial capital tied up in cards stored in inventory.

The management node 112 has a card inventory software program 121 for tracking inventory of cards. When a new card order is being processed by the management node 112, the management node 112 provides the card vendor 108 with card numbers and card expiration dates. The management node 112 stores the expiration information and other card data in the card inventory database 119. The management node 112 tracks the status of the cards as they progress through the system and updates the card inventory database 119 accordingly.

The vendor 108 embosses card numbers and expiration dates on cards prior to shipping them to the card issuer location 102. The vendor also encodes information onto a magnetic stripe of the card.

Orders for cards can also be placed via the Internet 115. Such orders may be from individual consumers or large companies. Such Internet orders may be fulfilled from vendor inventory 110, although Internet orders can be fulfilled from card inventory at any location.

Card Inventory Software Program

The management node 112 has a card inventory software program 121 to track the inventory of the expiration-sensitive cards at the various locations. The card inventory program 121 is communicatively coupled to the card inventory database 119. Furthermore, the card inventory program 121 determines when cards should be re-ordered for any particular site. A card issuer may not wish to sell an expiration sensitive card if the expiration date is too near the current date. Thus, the card issuer is allowed to specify a parameter that determines how close to the card's expiration date the card can be sold (staleness parameter). Thus, the parameter can be used to define an expiration sensitive card as stale. The card inventory program 121 factors in this user-entered staleness parameter to determine if the re-order criterion is met.

The card inventory program 121 can determine if a re-order criterion is met for each type of card and for each particular site. For example, the criterion for a gift card may be that the quantity of cards on hand drops below 250 cards, whereas the criterion for a travel card may be the inventory dropping below 50 cards. The re-order criterion may be based on the time of year. For example, the re-order criterion for cards associated with Christmas may be substantially different near Christmas than at other times of the year. Further, the re-order criterion for a given type of card at one particular site may be 500 cards, while it may be 100 cards at another site.

The site may be a card issuer location 102; however, the present invention is not so limited. For example, the card inventory program 121 may also track card inventory at the vendor 108 such that the card inventory program 121 is able to initiate automatic re-ordering of cards for the vendor inventory 110. Moreover, the present invention is not limited to tracking card inventory at the locations depicted in FIG. 1.

The card inventory program 121 is accessible by the card issuer via a private network connection 117, in one embodiment. The card issuer's computer system 105 may run a conventional web browser or the like to access the card inventory program 121 on the management node 112 via private connection 117. In another embodiment, a card issuer's computer system 105 executes a locally-installed component of the card inventory program 121.

As an example of using the card inventory program 121, FIG. 2 is an exemplary graphical user interface 200 that depicts a card inventory summary, in accordance with an embodiment of the present invention. The card inventory summary shows, for a selected card issuer 205, card program 210 and card issuer location 102, the quantity of cards on hand 215, the quantity on order 220, and whether there is a pending order 225. Also displayed are details about the cards such as the card design 230, the message embossed 235 on the card and the card's assigned monetary value 240.

Process Flow Overview

The inventory of expiration date sensitive cards is tracked such that re-ordering can be automatically initiated, in accordance with an embodiment of the present invention. In accordance with the present embodiment, a first value is generated based on how many cards are in stock at a particular site. The site may be a card issuer site, although the site may also be a vendor site or other site. An expiration date is determined for each of the cards in stock at the particular site. Based on the current date and the expiration dates associated with the cards, a number of expired cards in the stock at the particular site is determined. An inventory total is generated based, at least in part, on the first value and the number of expired cards. The inventory total is compared with a threshold value to determine whether a re-order criterion for cards at the particular site has been satisfied.

Each card may have an expiration date beyond which it is no longer valid for making purchases ("official expiration date"). A user of the card inventory software program is allowed to enter a staleness parameter that defines how long prior to the official expiration date the card should be sold. Thus, a user-specified expiration date is based on the official expiration date and the staleness parameter. In accordance with one embodiment, when determining the expiration date for each of the cards in stock at the particular site, the card inventory software program accesses the user-specified staleness parameter to determine which cards meet user-specified expiration dates.

In accordance with one embodiment, a re-order parameter is used to specify whether an order to replenish the cards is "pending user approval" or "automatic". If the parameter indicates that the order to replenish is automatic, then responsive to the re-order criterion being satisfied, the order is placed in a queue with an indication that the order is approved. If the parameter indicates that the order to replenish is not automatic, then responsive to the re-order criterion being satisfied, the order is placed in the queue with an indication that the order is pending approval.

In accordance with one embodiment of the present invention, after placing the order on the queue, a notification is sent to a user that the order has been placed in the queue.

In accordance with one embodiment of the present invention, a determination is made as to whether any cards at the particular site are stale based on an official expiration date and a staleness parameter. A notification is transmitted to a user associated with the particular site identifying any cards determined to be stale. Even cards that are not automatically designated to be stale may be changed to stale responsive to receiving user input that indicates that the card is stale. For example, the user may cause the card's designation to be changed to stale by entering information into the card inventory software program.

Configuration Parameters

A user associated with the card issuer is allowed to establish configuration parameters that are used by the card inventory program, in accordance with an embodiment of the present invention. The card inventory program causes display of a graphical user interface (GUI) that allows the user to enter configuration parameters. The management node executing the card inventory program may send messages (e.g., computer executable instructions, web pages, etc.) to a computer system at a card issuer's site that cause the computer system to display the GUI. The card issuer's computer system may run a web browser to interface with the management node and to display the GUI, although this is not a requirement. Alternatively, a computer system at the card issuer's site may have the card inventory program stored thereon, wherein local execution of the card inventory program causes the computer system to display the GUI.

Referring again to FIG. 2, in order to configure parameters, the user may select one or more of the labels in the function list 250 to cause another GUI to be displayed. For example, if the user selects the default settings label 252 in the GUI 200, the user may be presented with the GUI depicted in FIG. 3A that allows a user to set configuration parameters, in accordance with an embodiment of the present invention. The default settings 310 include an automatic re-order option 320. The GUI in FIG. 3A allows the user to specify whether the automatic re-order option is allowed for the various locations (e.g., banks, stores) associated with the card issuer. If automatic re-order is allowed, then each individual location may select whether to enable the option.

The user is also allowed to enter a staleness parameter 325 that specifies how many months prior to a card's official expiration date it is considered to be stale. In this case, the user has specified three months. The user is allowed to specify parameters 330, 335 related to follow up notifications that are issued during the automatic re-order process and a card transfer process. The approval notification parameter 330 and the receipt notification parameter 335 will be discussed below.

FIG. 3B illustrates a GUI allowing configuration of default settings, in accordance with an embodiment of the present invention. Default settings may apply for all card issuer locations for which independent configuration parameters are not established. The user may specify whether an order to replenish the cards at a particular site is pending approval or automatic by selected either the "on" of the "off" button associated with auto-reorder 360. The user may also specify how low the card inventory may drop prior to automatic initiation of re-ordering cards (re-order point) 370, as well as how many how many cards should be included in a new order (order quantity) 380. A minimum order quantity 390 is provided to the user indicating the minimum size order the user may place.

Card Designation

In order to assist in tracking card inventory, cards are designated with one or more status identifiers, in accordance with an embodiment of the present invention. For example, a card designation may relate to a card order (order status) or a card designation may relate to a property of the card (card status). It is not required that a card be physically identified to have a card designation associated therewith. For example, an order status can apply prior to a specified card being identified to fulfill an order. An order status may describe that a card order is pending approval, is on order with automatic approval, is being shipped to the card issuer location, has been received at the card issuer location, etc. A card status typically applies to a property of a specifically identified card. A card status may describe whether a card is damaged, stale, expired, issued, or pending issuance, etc. The card designations may be stored in the card inventory database (FIG. 1, 119). The card designations described herein are exemplary.

The card designations may be automatically changed by a card inventory program executing on the management node based on analysis of card processing. For example, when a card order is initiated, all cards in the order may be designated with a status by the inventory program. The card designation may also be changed by the inventory program responsive to user input. For example, a user associated with a card issuer can access the card inventory program via a private network connection, wherein the user employs a GUI to enter information that the card inventory program uses to change card designation. In one particular example, a user can provide an indication to the card inventory program that a card order has been received at a particular location, wherein the card inventory program updates the order status in the card inventory database. The card designations can be used by the card inventory program to determine how many cards are either physically in stock at a particular location or expected to be delivered to a particular site.

A) Card Order Status

Figure 4:
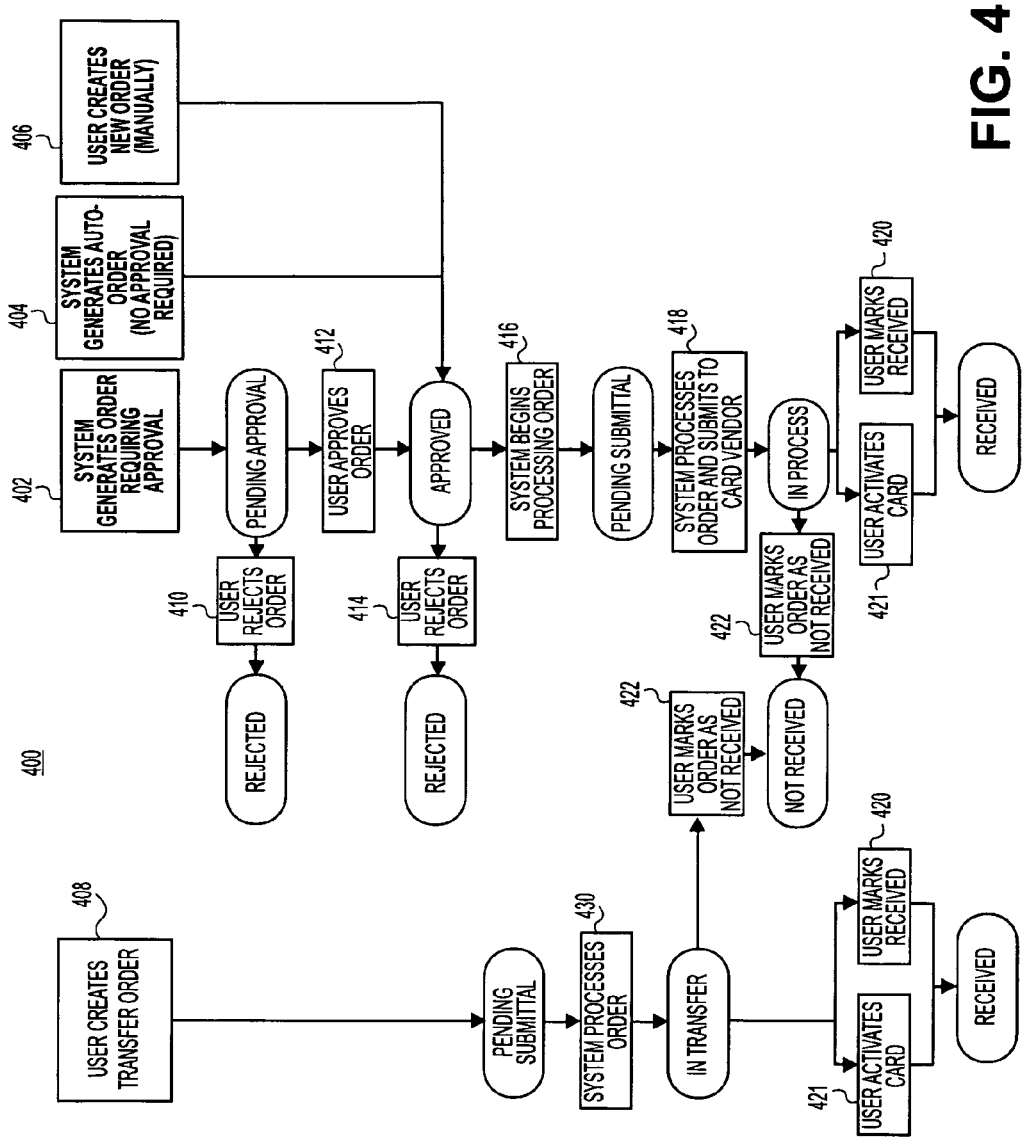
FIG. 4 illustrates a flow diagram of a process of tracking cards by status, in accordance with an embodiment of the present invention.

FIG. 4 illustrates a flow diagram of a process 400 of card order status, in accordance with an embodiment of the present invention. The card order statuses are exemplary. The card order status may be stored in a card inventory database. Steps of process 400 can be stored as sequences of instructions on a computer readable medium and may be executed on one or more computer processors. For example, computer systems at the card issuer site and/or the management node may have one or more processors that execute at least a portion of the instructions.

A card order can be initiated in numerous ways, as depicted in blocks 402-408. In block 402, the management node generates an order that requires approval by the user before it is further processed, wherein the card order is designated as "pending approval". If the user cancels (or rejects) the card order in block 410, the order status is changed to "canceled" (or "rejected"). If the user approves the card order in block 412, the order status is changed to "approved". In block 404, the card inventory program generates a pre-approved order, which is an order that does not require user approval for further processing. In this case, the order status is initially designated as "approved". In block 406, the user manually places a new card order, in which case the order status is initially designated as "approved". The user may initiate steps to place a manual order by selecting "new order" in the function list (FIG. 2, 250).

In any of the cases in which the card order is designated as approved, the user still has a chance to cancel the card order in block 414, in which case the order status is designated as "canceled". The order status is designated as "pending submittal" when the management node begins processing the order in block 416. After the management node processes the order and submits the order to the card vendor, in block 418, the order status is designated as "in process".

When the physical cards are received at the card issuer location, the order status can be changed from "in process" to another status in a variety of ways. The card issuer can designate the order status as being received, in block 420. Specifically, upon receiving a shipment, the card issuer can access the card inventory program and indicate that the order has been received, thus changing the order status from "in process" to a designation of "received".

Another way the order status of cards received at a card issuer location is changed is by the card inventory program identifying that a single card in a batch designated as "in process" has been received in block 421, thereby implying that the entire batch has been received. When a card order is received at a card issuer location, the order status may not be changed to designate that the order has been received if, for example, the card issuer does not enter information into the card inventory program. In such a case, when a single card of the batch is activated (e.g., issued to a customer) this may imply that the entire order has been received at the card issuer location. Thus, responsive to a single card of the batch being activated, the order status for all cards in the batch may be automatically changed to "received". The card issuer can access the card inventory program to change the status of the issued card to "activated" as a part of normal card issuance. Therefore, no further user action is required to change the designation of other cards in the batch. Note that there may be an order status associated with a card (e.g., in process, received, not received), as well as a card status (e.g., pending issuance, activated, etc.). Thus, the other cards in the batch may have both an order status of "received" and a card status of "pending issuance".

An order status may be changed from "in process" to "not received" if there is reason to believe that the card order will not be received by the card issuer (block 422). For example, the card issuer may track an overnight shipping of the card order from the vendor to the card issuer. This information may indicate to the card issuer that the cards will not be received as expected, thus warranting a change of status to "not received". If the card order later arrives, the card order status can be changed. The designation that applies to an individual card can also be changed when the card order status is changed, as discussed below under the heading "Card Status". The card inventory program automatically adjusts the inventory to reflect the change in the card designation.

Alternatively, the management node transfers a notification to a user associated with the particular site if an "in process" order being shipped to the site has not been confirmed as received, in accordance with one embodiment. The user may establish the timing for sending this notification with the "recipient notification follow up days" 335 in the GUI of FIG. 3A.

Another way that an order may be initiated is by the card issuer transferring one or more cards from one particular location to another (block 408), in which case the order status is designated as "pending submittal". The user may indicate to the card inventory program that cards are being transferred by selecting "transfer cards" in the function list (FIG. 2, 250) and listing the card numbers of the cards being transferred.

After the management node processes the transfer order (block 430), the order status is designated as "in transfer". When the order is received at a card issuer location, the order status may be changed in a similar manner to a card order with a status of "in process", as discussed herein.

B) Card Status

In addition to an order status, a card status is assigned to each card and stored in the card inventory database, in accordance with an embodiment of the present invention. Exemplary card statuses include, but are not limited to "active", "damaged," "stale," "expired," "pending issuance," "lost", and "issued." Cards can be given many other designations applying to conditions after they have been issued, as well.

If a card received at a particular location is physically damaged, the card issuer may change the status to "damaged" by accessing the card inventory program. A card may be designated as being stale if its official expiration date is too close to the current date. A card may be designated as "expired" if the current date is past the card's official expiration date. A card may be designated as "issued" when it is issued to a customer. A card may be designated as "pending issuance" if an order for the card has been placed and it is has not yet been issued to a customer, provided that another status such as "damaged", "stale" or "expired" does not apply.

The user may effect a change in the card's status by accessing the card inventory program, in accordance with one embodiment. For example, the user may indicate to the card inventory program that cards are damaged or stale by selecting "damaged cards" or "stale cards" in the function list (FIG. 2, 250) and listing the card numbers of the cards to be designated as damaged or "stale". Under certain conditions, the card inventory program may also change the status of a card without user intervention, in accordance with one embodiment. For example, the card inventory program may designate a card as "stale" or "expired" without user intervention, based on stored card expiration information.

In some cases, the cards in a batch can have their card status changed responsive to an event that affects the cards in a batch. Referring again to block 422 of FIG. 4, if a card order status for a batch of cards is changed to "not received", each of the cards in the batch may have their individual card status changed to "lost". The card inventory program may automatically adjust the card inventory based on the change in card status.

Determining if a Re-Order Criterion is Met

Figure 5:
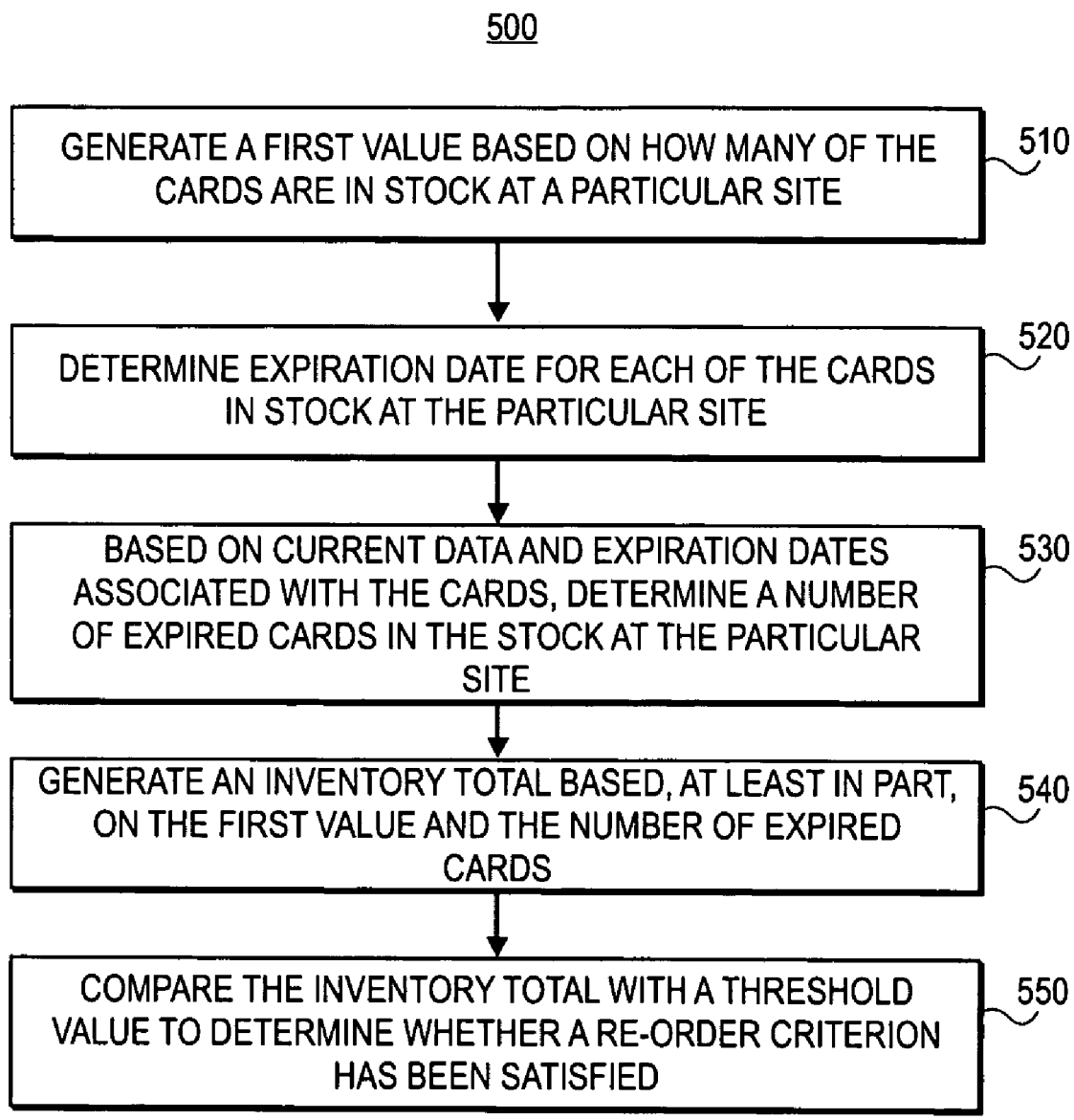
FIG. 5 illustrates a flow diagram of a process of determining if a card re-ordering criterion is satisfied, in accordance with an embodiment of the present invention.

FIG. 5 illustrates a flow diagram of a process 500 of determining if a card re-ordering criterion is satisfied, in accordance with an embodiment of the present invention. Steps of process 500 can be performed by executing sequences of instructions that are stored on a computer readable medium, and may be executed on one or more computer processors. Computer software executes on the management node (FIG. 1, 112) to perform process 500, in one embodiment. However, computer systems at the card issuer site and/or the management node may have one or more processors that execute at least a portion of the instructions. The process 500 can be performed at any convenient time. In one embodiment, the management node performs process 500 daily.

In block 510, a first value is generated based, at least in part, on how many cards are in stock at a particular site. The particular site may be a card issuer location such as a bank or store; however, the present invention is not so limited. The determination of the first value may be based on factors such as how many cards have been designated as "received" at the particular site, but not yet issued. In one embodiment, cards currently having an order status of "received" by the particular location and a card status of "pending issuance" are considered to be in stock. However, cards in stock are not limited to these designations.

The first value may be further based on a card being designated as damaged. Designating a card as damaged may occur responsive to a card issuer determining that a received card is damaged. Thus, while a damaged card may have been received at the particular site, a damaged card is not available for issuance to a customer. Thus, a card that is designated as damaged is not counted in the first value, in accordance with an embodiment of the present invention. In one embodiment, cards with an order status as received by the particular location and a card status of "damaged" are not counted in the first value.

The first value may be further based on a card being designated as not received at the particular site. In one embodiment, cards with an order status of "not received" are not counted in the first value.

Block 520 is determining an expiration date for each of the cards in stock at the particular site. Card expiration information may be stored in a card inventory database and may include an official expiration date after which a card is no longer valid and a user-specified staleness parameter that specifies a length of time for which the cards should be sold prior to the official expiration date. Block 520 may comprise determining the expiration date based on the official expiration date and may further be based on the user-specified staleness parameter. Using the user-specified staleness parameter is one way to determine a user specified expiration date.

Block 530 is a calculation of the number of expired cards at the particular site, based on the current date and the expiration dates determined in block 520. The expired cards may include cards that meet the user-specified staleness parameter. Thus, the expired cards may include cards that are considered stale.

In block 540 an inventory total is generated based, at least in part, on the first value from block 510 and the number of expired cards from block 530. While the inventory value may be based on the number of cards that are physically present at the particular site, the inventory value can be further based on cards that are expected to be received at the particular site in the near future. For example, an order status that indicates the cards are on route to the particular site may be added to the first value that was determined in block 510. Cards with an order status such as "in process" or "in transfer" or "submitted" are considered to be on route, in accordance with one embodiment. However, other designations may be used.

In block 550, the inventory total is compared with a threshold value to determine whether a re-order criterion has been satisfied for the cards at particular site. The threshold value may be provided by the user. For example, referring to FIG. 3B the user may establish a re-order point, which may vary depending on the time of year.

Re-Ordering Process Flow

Figure 6:
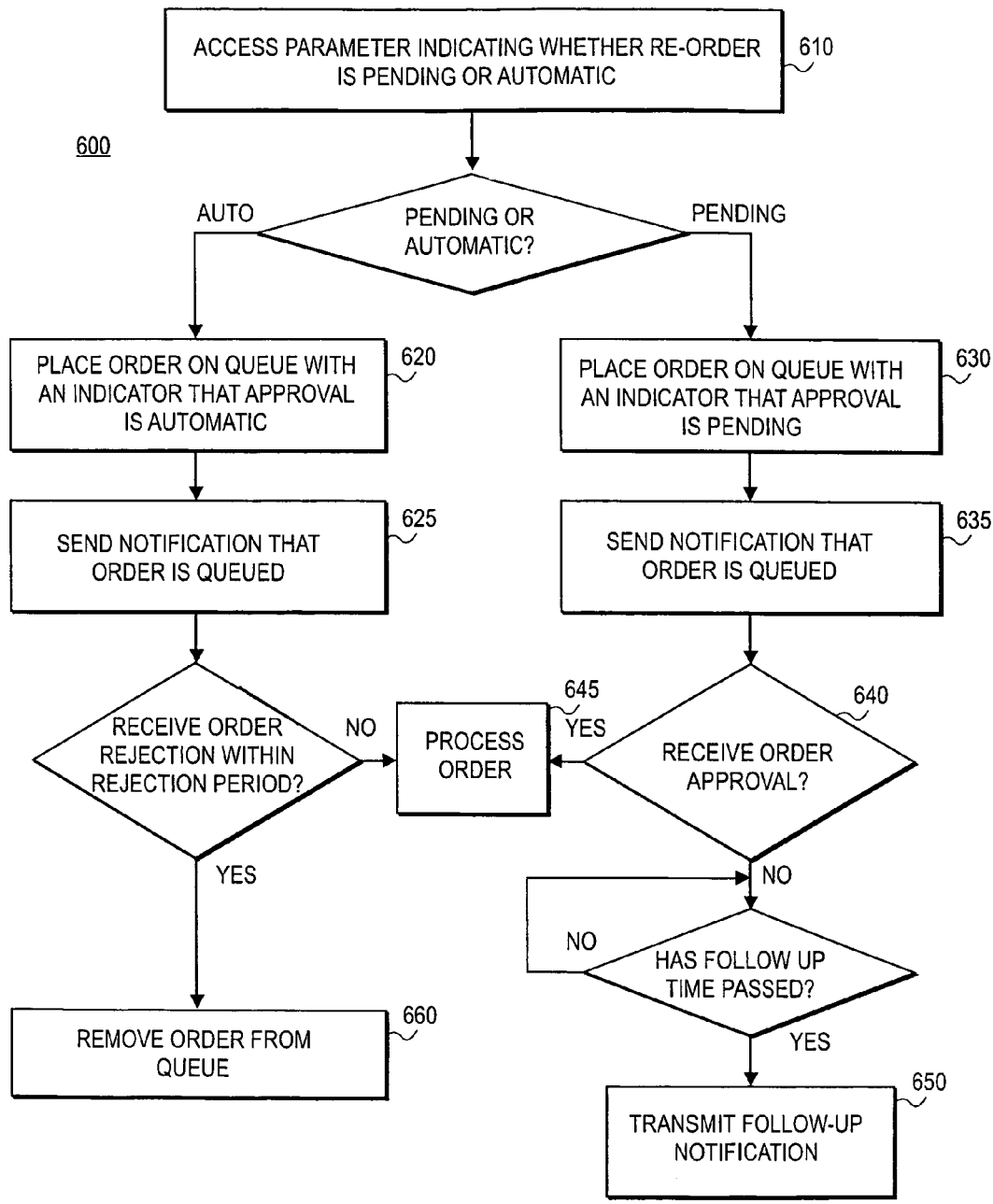
FIG. 6 is a flow diagram illustrating a re-ordering process, in accordance with an embodiment of the present invention.

FIG. 6 is a flow diagram illustrating a re-ordering process, in accordance with an embodiment of the present invention. Process 600 may be initiated automatically responsive to a re-order criterion being satisfied. For example, process 600 may be initiated responsive to block 550 of FIG. 5 being satisfied. Steps of process 600 can be performed by executing sequences of instructions stored on a computer readable medium, and may be executed on one or more computer processors. The management node performs process 600, in one embodiment. However, computer systems at the card issuer site and/or the management node may have one or more processors that execute at least a portion of the instructions.

In block 610, a parameter is accessed specifying whether an order to replenish the cards is pending approval or automatic. The parameter may be accessed from the card inventory database (FIG. 1, 119). A user associated with a particular site may have previously established this parameter using the exemplary GUI depicted in FIG. 3B to provide information to the card inventory program residing on the management node or elsewhere.

In block 620, if the parameter indicates that the order to replenish is automatic, then the order is placed in a queue with an indication that the order is approved. The queue may be a data structure stored in a computer readable medium at the management node. In block 625, a notification may be sent to a user associated with the particular site that the order has been placed on the queue with a status of automatic approval. The notification is not necessarily transmitted to the particular site.

In block 630, if the parameter indicates that the order to replenish is not automatic, then the order is placed in the queue with an indication that the order is pending approval. In block 635, a notification may be sent out notifying the user that the order has been placed on the queue with a status of order pending approval.

Upon receiving the notification, the user may access the card inventory program to display the order queue. FIG. 7 illustrates an exemplary GUI 700 including the order queue 700 for a given card issuer, in accordance with one embodiment. The GUI 700 shows the status 710 for each card order. The user may select one of the orders in the order number field 720 to bring up a GUI (not depicted) that allows the user to change the status, such as canceling or approving an order that is pending approval.

In the event that order approval is pending approval, if the user approves of the order within a pre-determined period of time (decision box 640), then the order is further processed in block 645. For example, the user may specify a parameter that indicates how long the user should be given to respond to the notification that the order has been placed on the queue with a pending approval status. The parameter may be, for example, the approval notification follow up 330 as depicted in FIG. 3A. If the user does not respond within the period, then a follow up notification is transmitted to the card issuer in block 650. Process 600 may then optionally return to block 640.

Even if the order approval is automatic, the user may be provided a given amount of time to cancel the order. For example, after the notification is transmitted in block 625, the user may have a pre-determined amount of time to cancel the order. If the user does not respond within the cancellation period, then processing of the order continues in block 645. If the user cancels the order within the cancellation period, then the order is removed from the queue in block 660.

Designating Cards as Stale

A) Card Inventory Program Initiated Staleness Designation

Figure 8:
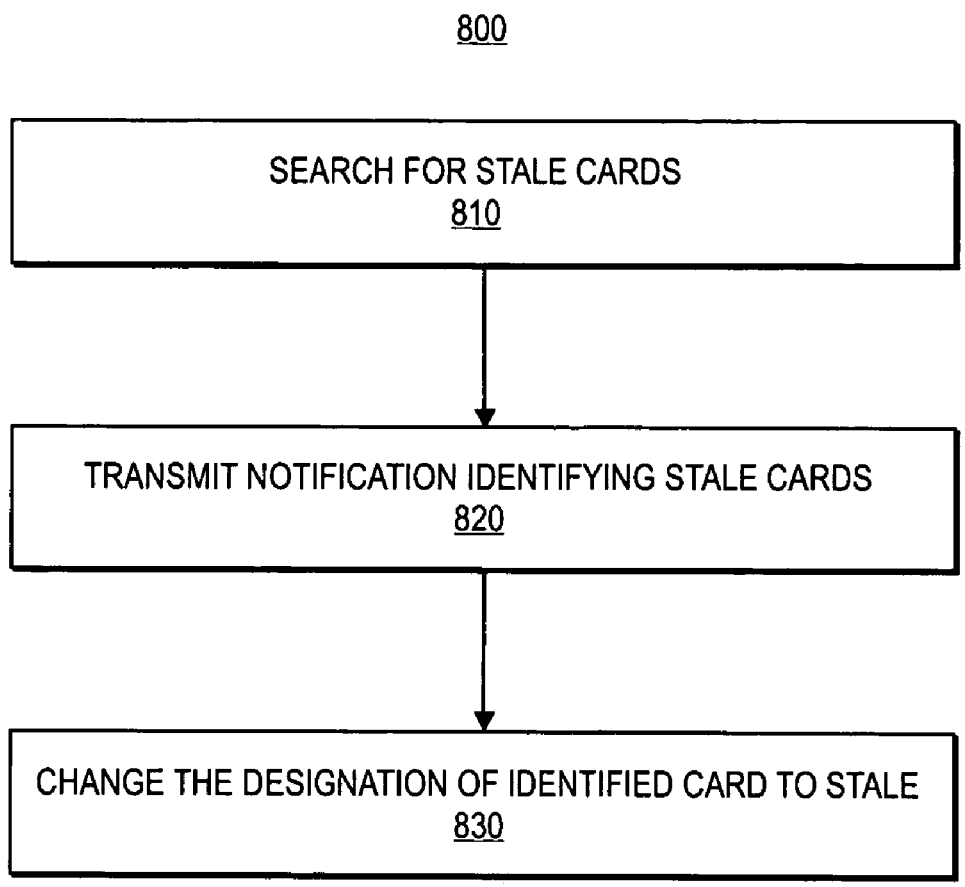
FIG. 8 is a flowchart illustrating a process of designating cards as stale, in accordance with an embodiment of the present invention.

FIG. 8 is a flowchart illustrating a process 800 of designating cards as stale, in accordance with one embodiment. Steps of process 800 can be performed by executing sequences of instructions that are stored on a computer readable medium, and may be executed on one or more computer processors. In block 810, the management node determines which cards are stale for at least one particular card issuer site. The determination may be initiated by the management node. For example, once a month the management node searches the card inventory database to determine which cards are stale based on a user-defined staleness parameter.

In block 820, a notification is sent to a user associated with the card issuer that one or more cards are stale, based on the user provided staleness parameter. The notification to the card issuer may identify cards that are stale and indicate that the card issuer should remove them from the inventory in accordance with the card issuer's policy for destroying stale cards. The management node sends an e-mail having a link (e.g., URL) to access the card inventory program to view details of the cards that are identified as stale, in one embodiment.

In block 830, the designation of the identified cards is changed to stale. Block 830 may involve a user associated with the card issuer accessing the card inventory program. For example, upon accessing the card inventory program, the user may be provided with a GUI that allows a user to indicate which cards should be designated as stale, wherein the management node updates the card inventory database responsive to receiving this indication. Process 800 then ends.

Another technique for designating cards as stale is for the management node to designate one or more cards as stale by updating the card inventory database and sending a notification to the card issuer that the cards have been designated as stale. The notification may also advise the card issuer that the cards should be removed from the inventory, as they have been designated as stale by the management node.

B) User Initiated Staleness Designation

The user can also initiate a process that designates cards as stale. For example, FIG. 9 illustrates a GUI 900 that allows a user associated with a card issuer to search for cards in the card inventory having a given range of expiration dates, in accordance with one embodiment. The user is allowed to specify the card issuer 902, card program 904, and location 906 to be searched for stale cards. Further, the user may specify a range of expiration dates 908 for which to search. The user is prompted with a message 905 that cards should be marked stale if they will expire within a period of time defined by the staleness parameter.

The GUI 900 also depicts a list 915 of cards meeting the expiration date range that were found based on searching the card inventory database. The user can select any of the boxes 917 to select which cards the user wishes to designate as stale. Selecting the stale button 920 sends an indication to the card inventory program that the selected cards should be designated as stale.

Automatic Re-Order Based on Card Inventory History

In one embodiment, the card inventory program automatically determines when cards should be re-ordered, based on history of card inventory. The card inventory program can perform this calculation daily to assure card volume does not fall below a specified amount. The card inventory program system determines that the projected available card inventory at a particular location drops below an inventory level defined by a reorder point percentage, it is time to order more stock. Meanwhile, the card inventory is expected to decrease gradually—until the replenishment eventually arrives.

Accordingly, the card inventory program will create a replenishment order at that point when the projected available inventory passes below the reorder point, in one embodiment. The system will account for outstanding orders (any order submitted and not yet confirmed received) when calculating future inventory needs.

Figure 11:
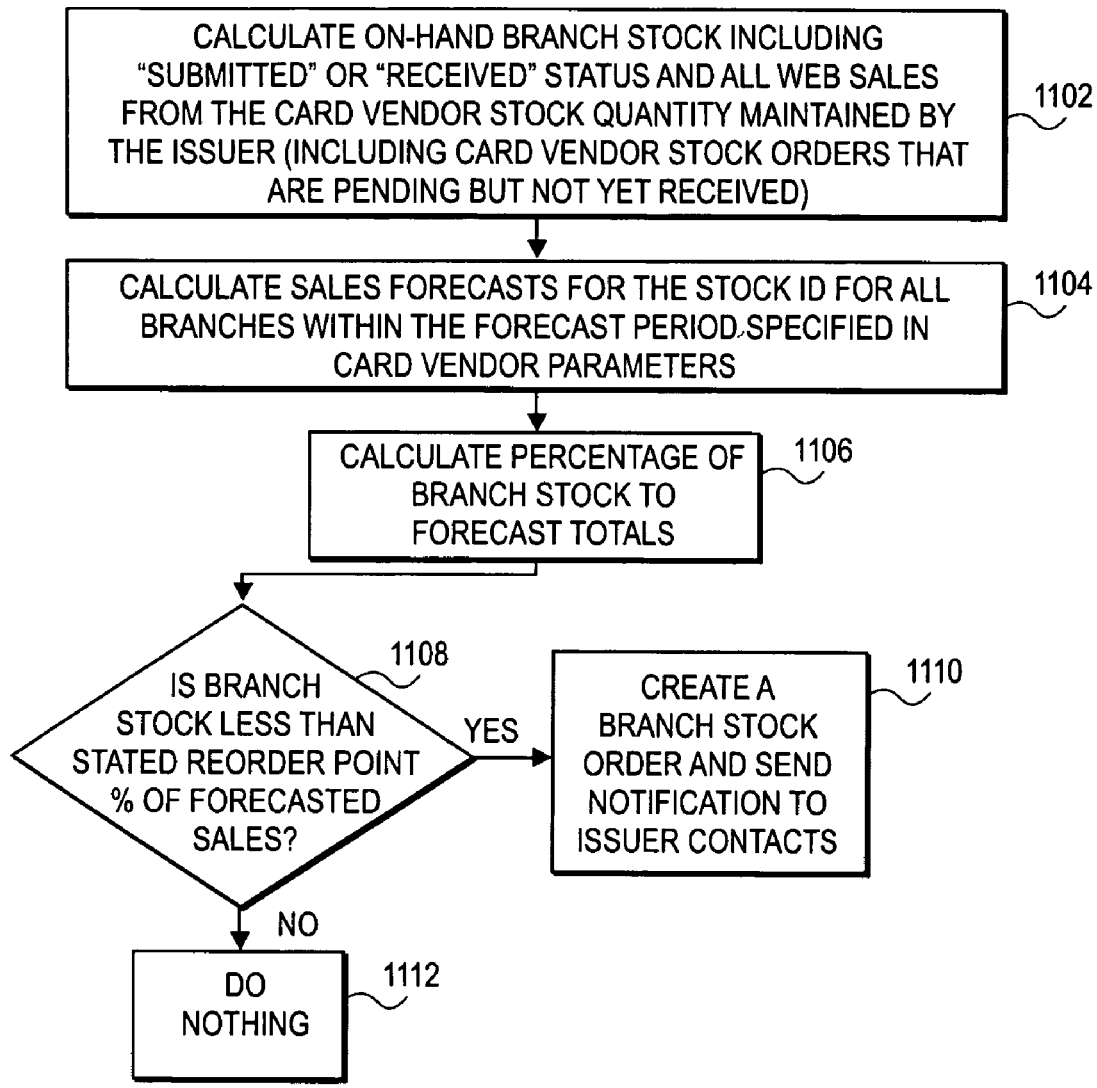
FIG. 11 is a flowchart illustrating a process of determining if a re-ordering criterion is met based on historic inventory data, in accordance with an embodiment of the present invention.

FIG. 11 is a process of determining when to re-order card inventory based on inventory history, in accordance with an embodiment of the present invention. Process 1100 is discussed in the context of the card inventory program making re-order decisions for a particular card issuer location. Similar calculations may be made for other card issuer locations.

In step 1102 the card inventory program calculates cards on hand at the particular location. The card inventory program makes separate determinations for different types of cards. For example, cards have can be associated with different programs, can be embossed with different designs, and can be associated with different business entities.

In step 1104, the card inventory program determines a rolling forecast amount for a forecast period. Separate forecasts are made for the different card types. The forecast period may be, for example, a month. Thus, the determination can be based on an estimate for the rest of the current month and a portion of the next month, such that a one month window of time is considered.

The rolling forecast amount can be based one or more factors. Among those factors are an estimated quantity of individual cards that will issue at the particular location, large company purchases, promotions cushion, and actual sales from a prior period. Examples of actual sales from a prior period are actual sales for a similar period in a previous year and actual sales over the last "x" days (e.g., last month). In one embodiment, the card inventory program tracks whether card sales are increasing or decreasing based on card sales over various periods of time. For example, the card inventory program compares card sales over the last seven days with the prior seven days to predict a trend in card sales. The card inventory program may also examine trends from other periods, such as similar months in previous years.

In step 1106, the card inventory program determines a relationship between the cards on hand at the particular location and the rolling forecast total. For example, the card inventory program determines a ratio of cards on hand at the particular location and the rolling forecast total (re-order point ratio).

In step 1108, the card inventory program determines whether to suggest re-ordering based in the relationship determined in step 1106 and a re-order criterion. For example, the card inventory program determines if the re-order point ratio is below a specified amount, then re-ordering criterion are met.

In step 1110, the card inventory program creates an order and sends a notification to a user associated with the particular location. In step 1112, no action need be taken if the re-order point ratio is above the specified amount.

Hardware Overview

Figure 10:
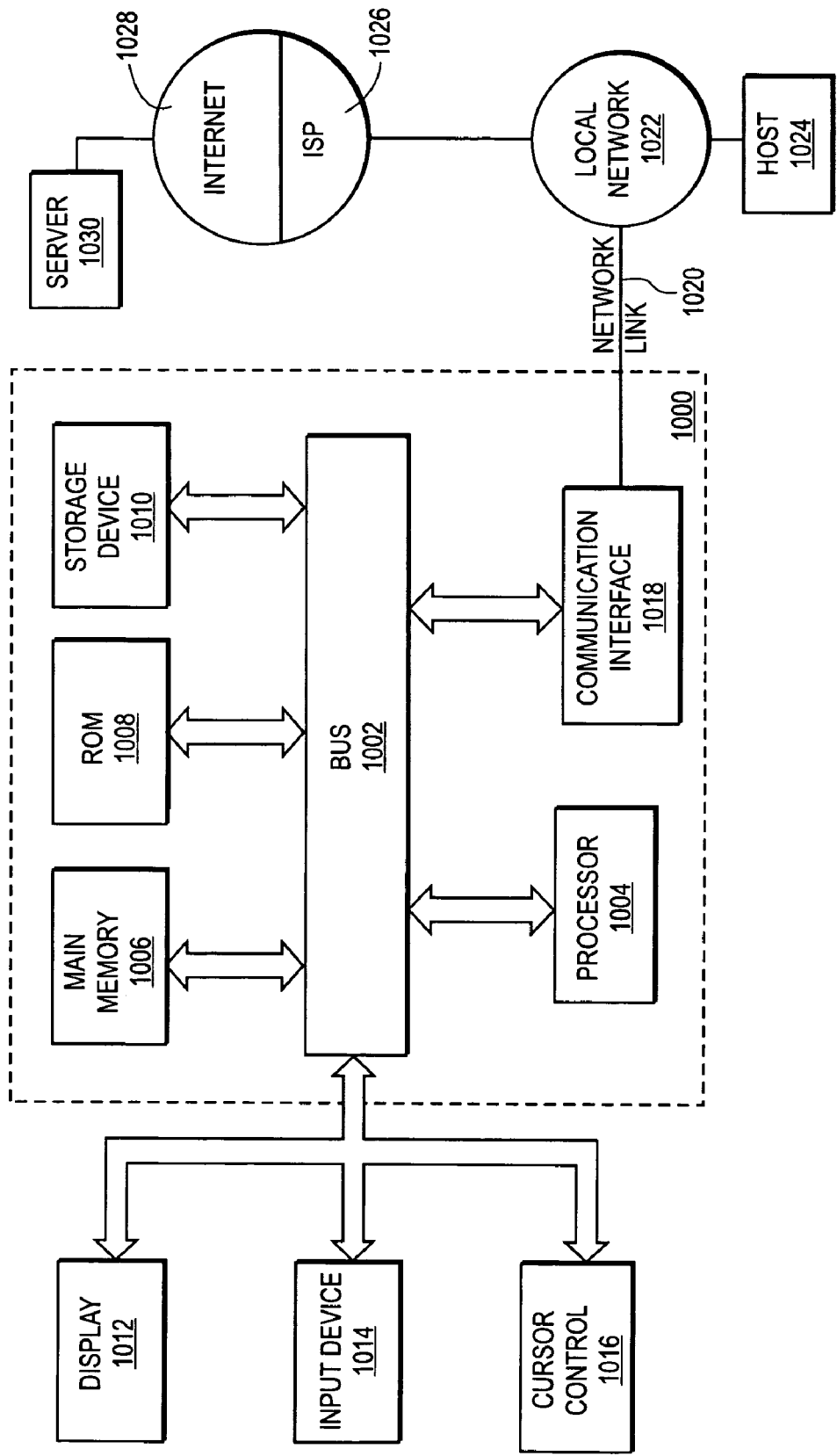
FIG. 10 is a block diagram that illustrates a computer system upon which an embodiment of the invention may be implemented.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may be used to implement the techniques described herein. According to one embodiment of the invention, those techniques are performed by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of tracking inventory of cards that have expiration dates, said method comprising:
generating a first value based, at least in part, on how many of said cards are in stock at a particular site;
determining a current date;
determining an expiration date for each of said cards in stock at said particular site;
based on said current date and expiration dates associated with said cards,
determining a number of expired cards in said stock at said particular site;
generating an inventory total based, at least in part, on said first value and said number of expired cards; and
comparing said inventory total with a threshold value to determine whether a card re-order criterion for said particular site has been satisfied;
wherein the steps of generating an inventory total and comparing said inventory total with a threshold value are performed by one or more computing devices.

2. The method of claim 1, further comprising:
receiving user input that specifies a length of time for which one or more of said cards should be issued prior to a time at which said one or more cards are no longer valid to make purchases; and
establishing the expiration date based on the length of time.

3. The method of claim 1, wherein said cards are pre-paid debit cards.

4. A method as recited in claim 1, wherein said generating the inventory total further comprises generating the inventory total based on cards designated as being on route to said particular site.

5. A method as recited in claim 1, further comprising:
in response to detecting that a card, in a batch of cards that is being delivered to but has not yet been confirmed to have arrived at said particular site, has been activated at said particular site, changing the designation of said batch of cards to indicate that said batch of cards is confirmed to have been received at said particular site.

6. A method as recited in claim 1, further comprising:
accessing a parameter specifying whether an order to replenish said cards is pending approval or automatic;
if said parameter indicates that the order to replenish is automatic, then responsive to said re-order criterion being satisfied, placing said order in a queue with an indication that said order is approved;
if said parameter indicates that the order to replenish is not automatic, then responsive to said re-order criterion being satisfied, placing said order in said queue with an indication that said order is pending approval.

7. The method of claim 6 further comprising, in response to placing said order in said queue, transmitting a notification to a user associated with said particular site that said order has been placed in said queue.

8. A method as recited in claim 1, wherein said generating the first value is further based on a number of cards associated with said particular site that are designated as damaged.

9. A method as recited in claim 1, wherein said generating the inventory total is further based on a number of cards that have been designated as in transfer from said particular site to another location.

10. A method as recited in claim 1, further comprising in response to receiving an indication that a batch of cards has not been received at said particular location, changing the designation of said batch of cards to indicate that said batch of cards has not been received at said particular site.

11. A method as recited in claim 10, wherein the changing the designation of said batch of cards includes changing an order status of the batch of cards.

12. A method as recited in claim 10, wherein the changing the designation of said batch of cards includes changing a card status of a card in the batch of cards.

13. A method as recited in claim 1, further comprising estimating how many cards will be issued at the particular site over a particular time period.

14. A method as recited in claim 13, wherein said estimating how many cards will be issued at the particular site is based on a history of issuance of cards at the particular site.

15. A method as recited in claim 13, wherein the card re-order criterion is further based on the estimate of how many cards will be issued at the particular site over the particular time period.

16. A computer-readable storage device storing one or more sequences of instructions which, when executed by one or more processors, causes the one or more processors to perform the method recited in claim 1.

17. A computer-readable storage device storing one or more sequences of instructions which, when executed by one or more processors, causes the one or more processors to perform the method recited in claim 2.

18. A computer-readable storage device storing one or more sequences of instructions which, when executed by one or more processors, causes the one or more processors to perform the method recited in claim 3.

19. A computer-readable storage device storing one or more sequences of instructions which, when executed by one or more processors, causes the one or more processors to perform the method recited in claim 4.

20. A computer-readable storage device storing one or more sequences of instructions which, when executed by one or more processors, causes the one or more processors to perform the method recited in claim 5.

21. A computer-readable storage device storing one or more sequences of instructions which, when executed by one or more processors, causes the one or more processors to perform the method recited in claim 6.

22. A computer-readable storage device storing one or more sequences of instructions which, when executed by one or more processors, causes the one or more processors to perform the method recited in claim 7.

23. A computer-readable storage device storing one or more sequences of instructions which, when executed by one or more processors, causes the one or more processors to perform the method recited in claim 8.

24. A computer-readable storage device storing one or more sequences of instructions which, when executed by one or more processors, causes the one or more processors to perform the method recited in claim 9.

25. A computer-readable storage device storing one or more sequences of instructions which, when executed by one or more processors, causes the one or more processors to perform the method recited in claim 10.

26. A computer-readable storage device storing one or more sequences of instructions which, when executed by one or more processors, causes the one or more processors to perform the method recited in claim 11.

27. A computer-readable storage device storing one or more sequences of instructions which, when executed by one or more processors, causes the one or more processors to perform the method recited in claim 12.

28. A computer-readable storage device storing one or more sequences of instructions which, when executed by one or more processors, causes the one or more processors to perform the method recited in claim 13.

29. A computer-readable storage device storing one or more sequences of instructions which, when executed by one or more processors, causes the one or more processors to perform the method recited in claim 14.

30. A computer-readable storage device storing one or more sequences of instructions which, when executed by one or more processors, causes the one or more processors to perform the method recited in claim 15.

31. A management system for tracking inventory of debit cards that have expiration dates, said system comprising:
one or more processors; and
a computer-readable storage device storing one or more sequences of instructions, which when executed by said one or more processors implement a method of tracking inventory, said method comprising:
generating a first value based on how many of said debit cards are designated as received at a particular site but not yet issued;

generating a second value based on how many of said debit cards are designated as expected to be received at the particular site;

determining an expiration date for each of said debit cards designated as received at the particular site but not yet issued;

based on a current date and said expiration date for each of said debit cards, determining a number of expired debit cards of said debit cards designated as received at the particular site but not yet issued;

generating an inventory total based, at least in part, on said first value, said second value, and said number of expired debit cards; and comparing said inventory total with a threshold value to determine whether a re-order criterion at said particular site has been satisfied.

32. A management system as recited in claim 31, wherein the expiration dates associated with said debit cards are user-specified expiration dates.

33. A management system as recited in claim 32, wherein said method further comprises determining said user-specified expiration dates by accessing a user-specified staleness parameter that specifies a length of time for which said debit cards should be issued prior to a date for which said debit cards are no longer valid to make purchases.

34. A management system as recited in claim 31, wherein said debit cards are pre-paid debit cards.

35. A management system as recited in claim 31, wherein said method further comprises:

in response to receiving an indication that a debit card, in a batch of debit cards that is being delivered to but has not yet been confirmed to have arrived at said particular site, has been activated at said particular site, changing the designation of said batch of debit cards to indicate that said batch of debit cards is confirmed to have been received at said particular site.

36. A management system as recited in claim 31, wherein said method further comprises:

receiving a parameter from said particular site specifying whether an order to replenish said debit cards is pending approval or automatic;

if said parameter indicates that the order to replenish is automatic, then responsive to said re-order criterion being satisfied, placing said order in a queue with an indication that said order is approved;

if said parameter indicates that the order to replenish is not automatic, then responsive to said re-order criterion being satisfied, placing said order in said queue with an indication that said order is pending approval.

37. A management system as recited in claim 36, wherein said method further comprises, in response to placing said order in said queue, transmitting a notification to a user associated with said particular site that said order has been placed in said queue.

38. A management system as recited in claim 31, wherein said method further comprises changing a designation of a debit card to indicate the debit card is damaged, wherein said debit card designated as damaged is not included in said first value.

39. A management system as recited in claim 31, wherein said method further comprises:

in response to an indication that a debit card is in transfer from one user location to said particular site, changing the designation of said debit card to indicate said debit card is being transferred to said particular site; and including said debit card designated as being transferred to said particular site in said second value.

40. A management system as recited in claim 31, wherein said method further comprises in response to an indication that a debit card has not been received at said particular site, changing a designation of said debit card to indicate it has not been received at said particular site.

41. A management system as recited in claim 31, wherein said method further comprises:

determining if any debit cards at the particular site are stale based on said expiration date for each of said debit cards and a user-specified time period; and transmitting a notification to a user associated with said particular site identifying any debit cards determined to be stale.

42. A management system as recited in claim 41, wherein said determining if any debit cards at the particular site are stale is responsive to a user query.

43. A management system as recited in claim 41, wherein said determining if any debit cards at the particular site are stale is initiated automatically by said management system.

44. A management system as recited in claim 41, wherein said method further comprises designating as stale said debit cards determined to be stale.

45. A management system as recited in claim 31, further comprising:

in response to a request to cancel a card order, changing the designation of a group of said debit cards to cancelled.

46. A management system as recited in claim 45, further comprising re-generating the second value in response to the change in designation of the group of debit cards to cancelled.

* * * * *